United States Patent [19]

Nashiki et al.

[11] Patent Number: 5,039,900
[45] Date of Patent: Aug. 13, 1991

[54] BRAKING DEVICE FOR A ROTARY MOTOR INCLUDING A COMPRESSION SPRING AND PIEZOELECTRIC ELEMENT

[75] Inventors: Masayuki Nashiki; Yuichi Itani, both of Niwa, Japan

[73] Assignee: Kabushiki Kaisha Okuma Tekkosho, Aichi, Japan

[21] Appl. No.: 480,540

[22] Filed: Feb. 15, 1990

[30] Foreign Application Priority Data

Feb. 15, 1989 [JP] Japan .................. 1-35497

[51] Int. Cl.$^5$ ............................. H01L 41/08
[52] U.S. Cl. ...................... 310/328; 310/77
[58] Field of Search .................... 310/328, 77

[56] References Cited

U.S. PATENT DOCUMENTS

| | | | |
|---|---|---|---|
| 4,059,779 | 11/1977 | Wistinghausen | 310/77 |
| 4,174,182 | 9/1979 | Lendl | 310/328 |
| 4,438,363 | 3/1984 | Babitaka et al. | 310/328 |
| 4,769,569 | 9/1988 | Stahlhuth | 310/328 |
| 4,854,424 | 8/1989 | Yamatoh et al. | 310/328 |

FOREIGN PATENT DOCUMENTS

| | | | |
|---|---|---|---|
| 0834145 | 3/1952 | Fed. Rep. of Germany | 310/77 |
| 2807591 | 8/1979 | Fed. Rep. of Germany | 310/77 |
| 2588702 | 4/1987 | France | 310/77 |
| 0204272 | 10/1985 | Japan | 310/328 |
| 0213275 | 10/1985 | Japan | 310/328 |
| 0226710 | 9/1988 | Japan | 310/328 |
| 0178892 | 1/1965 | U.S.S.R. | 310/77 |
| 0676663 | 7/1952 | United Kingdom | 310/77 |
| 0803824 | 11/1955 | United Kingdom | 310/77 |

Primary Examiner—Mark O. Budd
Assistant Examiner—Thomas M. Dougherty
Attorney, Agent, or Firm—Wenderoth, Lind & Ponack

[57] ABSTRACT

A braking device for a rotary motor includes a braking member movably mounted to a non-rotating member of the rotary motor. The braking device further includes a compression spring coupled to the braking member for exerting a force on the braking member to cause the braking member to contact a rotating member of the rotary motor. The braking device further includes a piezoelectric element for actuating in response to a signal applied thereto to exert a force on the braking member to counteract the force applied to the braking member by the compression spring so as to cause the braking member to separate from the rotating member of the rotary motor.

8 Claims, 3 Drawing Sheets

BRAKING DEVICE FOR A ROTARY MOTOR INCLUDING A COMPRESSION SPRING AND PIEZOELECTRIC ELEMENT

BACKGROUND OF THE INVENTION

This invention relates to a rotary motor provided with a device for braking the motor rotation.

A magnetic brake has usually been used as a braking device for rotary motors.

FIG. 1 is a sectional view of a prior art rotary motor having a magnetic brake wherein a field 12 of an electromagnetic brake 10 is fixed on an end face thereof to an end face of a flange 5 at the stator 2 side of the rotary motor 1. An exciting coil 11 and a compression spring 16 are fixed to the other end face of the field 12 and a disc 15 is also fixed thereto at a distance. Between the field 12 and the disc 15 are mounted a rotary plate 14, which is fixed to a rotary shaft 4, and an armature 13 which can be moved parallel to the rotary shaft 4, and which is either pressed against the rotary plate 14 due to the elasticity of the compression spring 16 or separated from the rotary plate 14 due to the electromagnetic force of the exciting coil 11.

In order to allow rotation of the rotor 3 in the above mentioned structure, electricity is applied to the exciting coil 11 to generate an electromagnetic force which is sufficient to overcome the elasticity of the compression spring 16 so that the armature 13 is attracted toward the field 12 to place the rotary plate 14 in a contact free state. In order to apply a braking force on the rotor 3, the electricity is ceased from being applied to the exciting coil 11 to bring the armature 13 in contact with the rotary plate 14 so as to apply a braking force due to the friction between the armature 13 and the rotary plate 14 and between the disc 15 and the rotary plate 14.

The above mentioned prior art magnetic brake requires a large compression spring since the elasticity of the compression spring is used to obtain the frictional braking force, and, moreover, it requires a large exciting coil since the electromagnetic force for attracting the armature must be large enough to overcome the force of the compression spring. Therefore, the size and cost of the rotor motor become larger.

When a rotational angle of the rotary motor is detected by a device, such as a resolver, it is necessary in the prior art to magnetically shield the magnetic brake from the resolver since magnetic flux leakage of the brake tends to adversely affect the output of the resolver.

SUMMARY OF THE INVENTION

The present invention was conceived to overcome such problems encountered in the prior art and aims at providing a rotary motor having a rotational brake device which is compact and low in cost, and which does not cause magnetic flux leakage.

According to one aspect of the present invention, for achieving the objects described above, there is provided a rotary motor which includes fine movement mechanisms provided at a predetermined distance from a rotating member of the machine, wherein the fine movement mechanisms are brought into contact with the rotating member in response to a driving force so as to apply a frictional braking force to the rotating member.

According to another aspect of the present invention, there is provided a rotary motor including a braking member which is movable in a direction so to contact the rotating member of the rotary motor and in a direction so to move away therefrom, a compression device which brings the braking member into contact with the rotating member, and fine movement mechanisms which are provided at a predetermined distance from the braking member in contact with the rotating member. The rotating member is braked by bringing the braking member into contact with the rotating member by means of the compression member, and is released when the braking member is made to separate from the rotating member by activating the fine movement members.

The nature, principle and utility of the present invention will become more apparent from the following detailed description when read in conjunction with the accompanying drawings.

DESCRIPTION OF THE PREFERRED EMBODIMENTS

Figure 1:
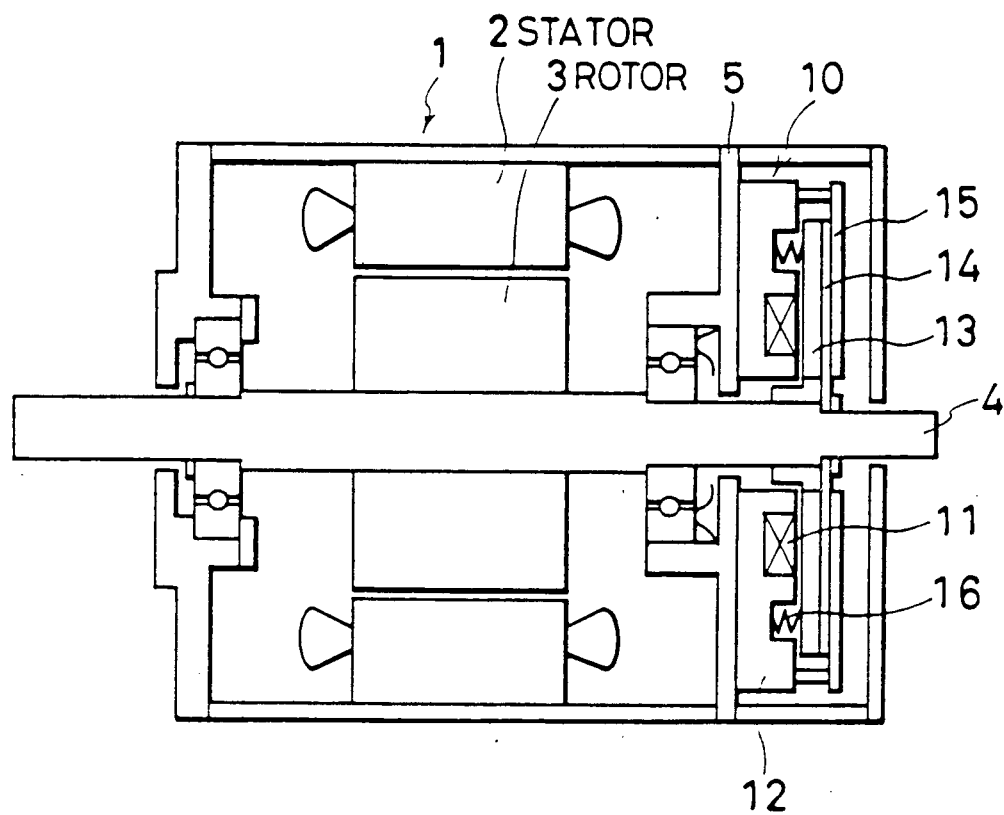
FIG. 1 is a sectional view of a prior art rotary motor.
Figure 2A:
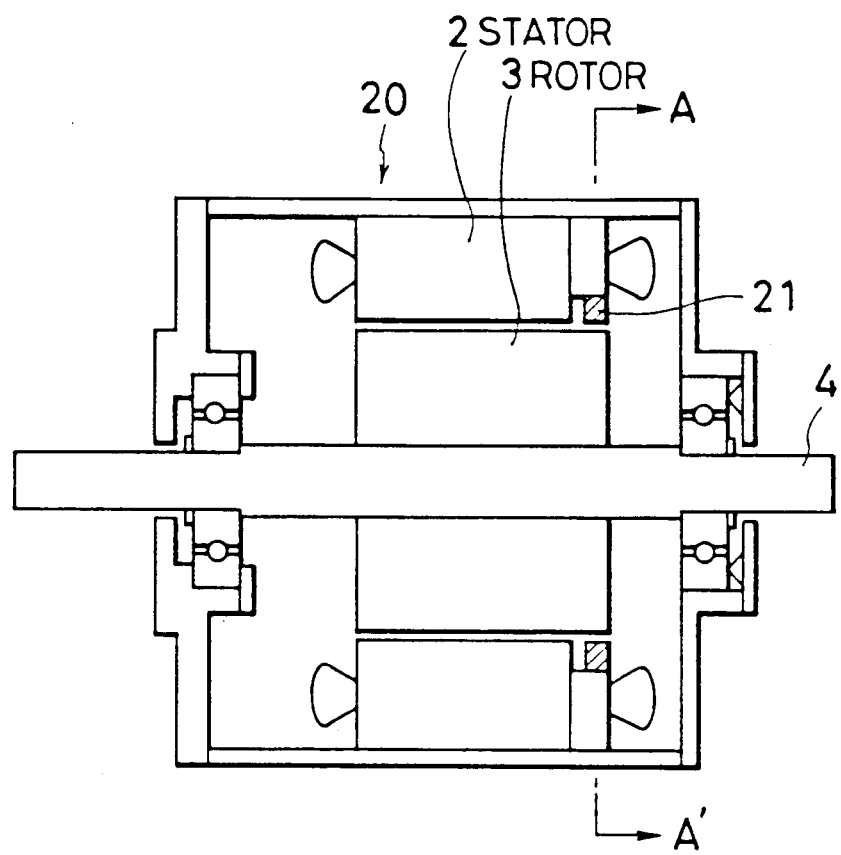
FIG. 2A is a sectional view of an embodiment of a rotary motor according to the present invention.
Figure 2B:
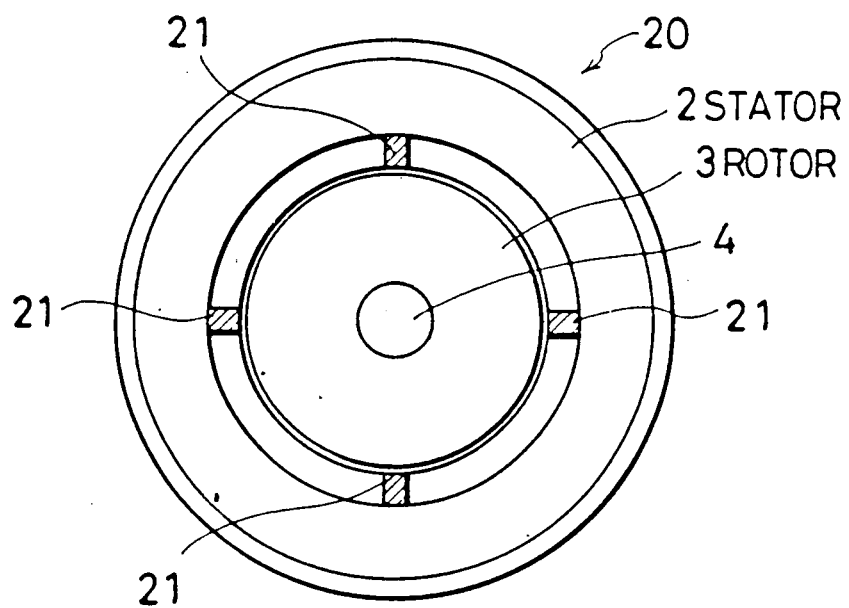
FIG. 2B is a sectional view along the line A-A' of FIG. 2A.

FIG. 2A is a sectional view of an embodiment of a rotary motor having a braking mechanism according to the present invention, and FIG. 2B is a sectional view thereof along the line A-A' shown in FIG. 2A. In the figures, the same component parts are denoted by the same reference numerals to omit duplication in description.

A rotary motor 20 includes piezoelectric elements 21, which are fine movement mechanisms, fixed on a stator 2 at a predetermined distance from a rotor 3. When electricity is applied thereto, the piezoelectric elements 21 extend in a direction toward the rotor 3 and eventually come into contact therewith. The resultant frictional force between the piezoelectric elements 21 and the rotor 3 is used to brake the rotor 3.

Although the piezoelectric elements 21 are depicted in FIG. 2B as numbering four and being spaced at equal intervals, the particular quantity and arrangement of the piezoelectric elements 21 may be selected arbitrarily. Furthermore, the applied frictional braking force is not limited to that between the piezoelectric elements 21 and the rotor 3. That is, the frictional force may be applied between the piezoelectric 21 and the rotating shaft 4 or between the piezoelectric elements 21 and any one of the members fixed on the rotary shaft 4.

Figure 3A:
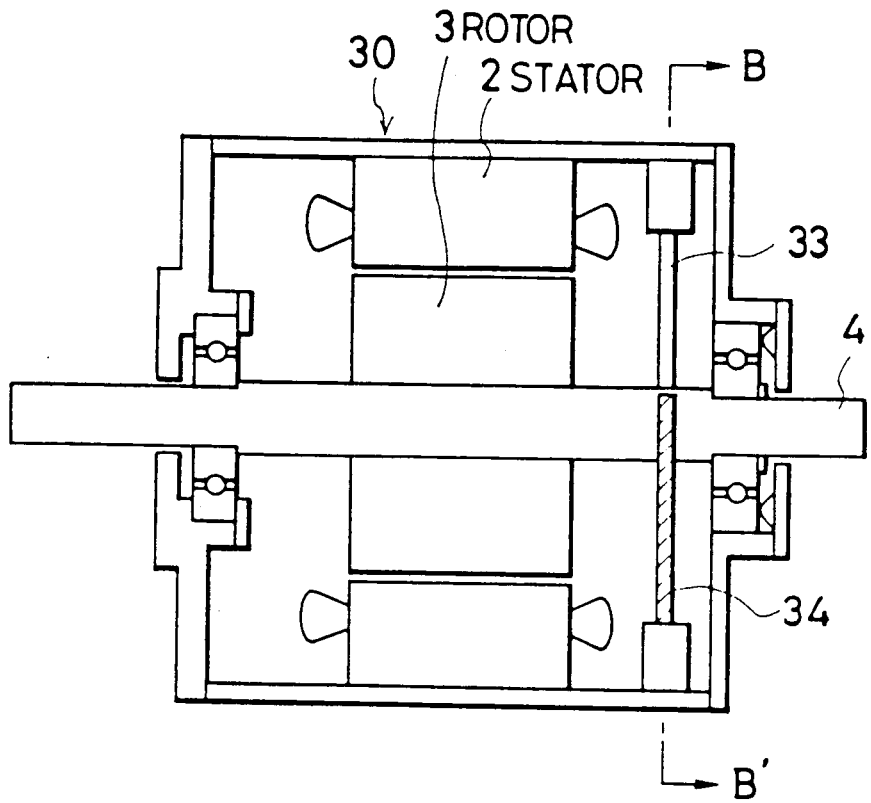
FIG. 3A is a sectional view of another embodiment of the rotary motor according to the present invention.
Figure 3B:
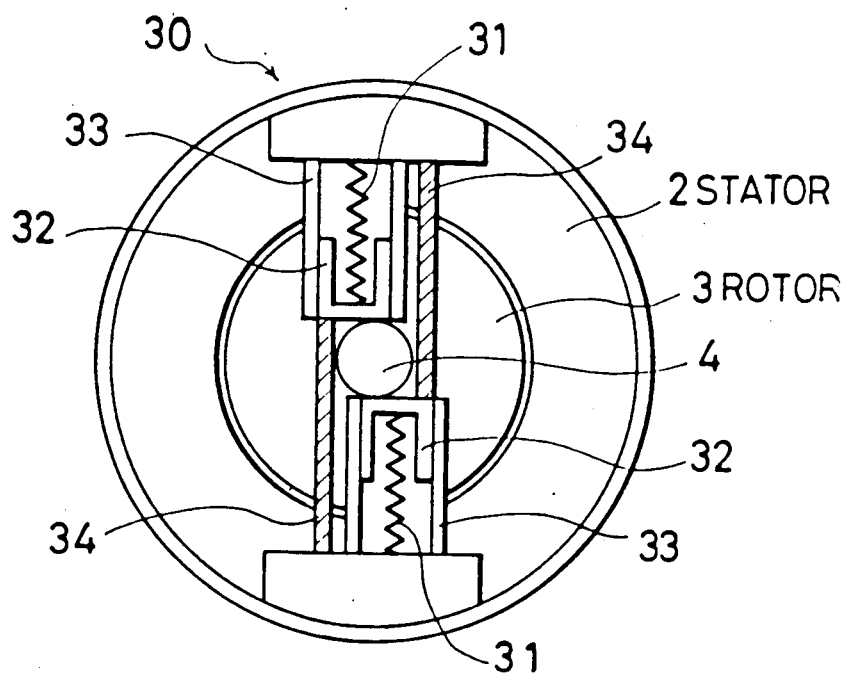
FIG. 3B is a sectional view along line B-B' of FIG. 3A.

FIGS. 3A and 3B are sectional views respectively of another embodiment of a rotary motor having a braking mechanism according to the present invention in which the same component parts are denoted by the same reference numerals for eliminating duplication in description.

A rotary motor 30 has a braking member 32 which is held by a compression spring 31 and which is slidable in a direction perpendicular to the axis of the rotary shaft 4 along guides 33 fixed on the inner circumference of the rotary motor 30. The braking member 32 comes into contact with the rotary shaft 4 due to the elasticity of the compression spring 31, thus applying a braking force on the rotary shaft 4 (or rotor 3) as a result of the friction therebetween. Piezoelectric elements 34, which are fine movement mechanisms, are fixed on the inner circumference of the rotary machine 30 at a predetermined distance from the braking member 32 which is in contact with the rotary shaft 4. When electricity is applied thereto, the piezoelectric elements 34 extend in a direction so as to compress the compression spring 31. As a result, the braking member 32 is separated from the rotary shaft 4, thus removing the braking force. Generally, a piezoelectric element has little resistance against to pulling force, but due to the construction mentioned above, the piezoelectric elements 34 are not burdened or stressed by a pulling or revolving force.

A higher braking force may be obtained if plural pairs of the braking members 32 and the piezoelectric elements 34 as shown above are employed.

As described in the foregoing, since the rotary motor having a braking device according to the present invention includes small-sized fine movement mechanism, the inclusion of an extra controlling device is not necessary and hence, the size of the rotary motor and the production cost can be reduced. Moreover, since magnetic circuits are not required, there is no leakage of magnetic flux so that the rotational angle of the motor can be precisely detected by devices such as a resolver.

It should be understood that many modifications and adaptations of the present invention will become apparent to those skilled in the art and the present invention is intended to encompass such obvious modifications and changes in the scope of the claims appended hereto.

What is claimed is:

1. A braking apparatus for a rotary device, the rotary device including a rotating member and a non-rotating member, said braking apparatus comprising:
   a braking member movably mounted to the non-rotating member of the rotary device;
   compression means, mounted to the non-rotating member and coupled to said braking member, for exerting a first force on said braking member to cause said braking member to contact the rotating member of the rotary device; and
   fine movement means, mounted to the non-rotating member, for actuating in response to a signal applied thereto to exert a second force on said braking member, the second force of said fine movement means counteracting the first force of said compression means to cause said braking member to separate from the rotating member.

2. A braking apparatus as recited in claim 1, wherein said braking member is slidably in a direction which is perpendicular to a rotational axis of the rotating member.

3. A braking apparatus as recited in claim 1, wherein said compression means and said fine movement means are mounted to the non-rotating member at substantially opposite sides of a rotational axis of the rotating member.

4. A braking apparatus as recited in claim 2 wherein said compression means and said fine movement means are mounted to the non-rotating member at substantially opposite sides of the rotational axis of the rotating member.

5. A braking apparatus as recited in claim 1, wherein said compression means includes a compression spring.

6. A braking apparatus as recited in claim 2, wherein said compression means includes a compression spring.

7. A braking apparatus as recited in claim 3, wherein said compression means includes a compression spring.

8. A braking apparatus as recited in claim 4, wherein said compression means includes a compression spring.

* * * * *